US012508033B2

(12) United States Patent
O'Brien et al.

(10) Patent No.: US 12,508,033 B2
(45) Date of Patent: Dec. 30, 2025

(54) OCCLUSION DEVICE HAVING SPHERICAL SECONDARY SHAPE AND MANDREL FOR FORMING SAME

(71) Applicant: Boston Scientific Scimed, Inc., Maple Grove, MN (US)

(72) Inventors: John-Alan O'Brien, County Cork (IE); Conor O'Sullivan, Wilton Cork (IE); Frank Ryan, Frankfield Cork (IE)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1066 days.

(21) Appl. No.: 17/537,812

(22) Filed: Nov. 30, 2021

(65) Prior Publication Data

US 2022/0087686 A1 Mar. 24, 2022

Related U.S. Application Data

(63) Continuation of application No. 15/003,308, filed on Jan. 21, 2016, now abandoned.

(60) Provisional application No. 62/106,445, filed on Jan. 22, 2015.

(51) Int. Cl.
*B21F 3/00* (2006.01)
*A61B 17/12* (2006.01)
*A61B 17/00* (2006.01)

(52) U.S. Cl.
CPC .. *A61B 17/12145* (2013.01); *A61B 17/12113* (2013.01); *A61B 2017/00526* (2013.01); *A61B 2017/00867* (2013.01)

(58) Field of Classification Search
CPC ...... B21F 3/00; B21F 3/02; B21F 3/04; B21F 3/10; B21F 3/12; B21F 3/027; B21F 45/00; B21F 45/008
See application file for complete search history.

(56) References Cited

U.S. PATENT DOCUMENTS

| 5,645,558 A | * | 7/1997 | Horton ............ A61B 17/12172 606/198 |
| 5,749,891 A | | 5/1998 | Ken et al. |
| 5,911,731 A | | 6/1999 | Pham et al. |
| 6,033,423 A | | 3/2000 | Ken et al. |
| 6,171,326 B1 | | 1/2001 | Ferrera et al. |
| 6,322,576 B1 | | 11/2001 | Wallace et al. |
| 6,585,754 B2 | | 7/2003 | Wallace et al. |
| 2002/0019647 A1 | | 2/2002 | Wallace et al. |
| 2008/0221554 A1 | | 9/2008 | O'Connor et al. |
| 2008/0221600 A1 | | 9/2008 | Dieck et al. |
| 2009/0125054 A1 | | 5/2009 | Teoh et al. |
| 2011/0245861 A1 | | 10/2011 | Chen et al. |

(Continued)

FOREIGN PATENT DOCUMENTS

EP 1962701 A2 9/2008
WO 0232325 A1 4/2002

*Primary Examiner* — Teresa M Ekiert
(74) *Attorney, Agent, or Firm* — Seager, Tufte & Wickhem, LLP

(57) ABSTRACT

Some aspects of the present disclosure pertain to spherical devices that comprise a wire having a memorized shape comprising a spherical outer wire layer and a spherical inner wire layer disposed within the spherical outer wire layer. Other aspects of the disclosure pertain to methods of forming such devices, mandrels for forming such devices, and methods of using such devices.

20 Claims, 4 Drawing Sheets

(56) References Cited

U.S. PATENT DOCUMENTS

2012/0071911 A1   3/2012  Sadasivan et al.
2015/0238200 A1\* 8/2015  Garza ................... B21F 45/008
                                                        606/200

\* cited by examiner

OCCLUSION DEVICE HAVING SPHERICAL SECONDARY SHAPE AND MANDREL FOR FORMING SAME

CROSS-REFERENCE TO RELATED APPLICATIONS

This application is a continuation of U.S. Utility application Ser. No. 15/003,308, filed Jan. 21, 2016, which claims the benefit of U.S. Provisional Application No. 62/106,445, filed Jan. 22, 2015, both entitled "OCCLUSION DEVICE HAVING SPHERICAL SECONDARY SHAPE AND MANDREL FOR FORMING SAME," which are hereby incorporated by reference in their entirety.

FIELD

This application relates generally to occlusive devices for creating vascular occlusions.

BACKGROUND

Vaso-occlusive devices are implants that are placed within the vasculature of the body to form occlusions in the vasculature, typically either to block the flow of blood through a vessel making up that portion of the vasculature via the formation of an embolus or to form an embolus within an aneurysm or other structure stemming from the vessel. The devices are typically implanted using a delivery catheter that is advanced endoluminally to the treatment site.

An example of a well-known vaso-occlusive device has an elongated helically-wound device having "primary shape" when constrained within a delivery catheter, and a three-dimensional "secondary" shape once deployed from the catheter and left, more or less, unconstrained in the implantation site. Because of the helical primary shape, these devices are generally referred to as vaso-occlusive coils. The coils are typically made of a relatively soft and flexible metal, for example, a platinum alloy, among others. Depending on the size and/or shape of the implantation space, one or more vaso-occlusive coils may be implanted.

SUMMARY

Some aspects of the present disclosure pertain to spherical devices that have a memorized spherical shape and comprise a wire having a memorized shape comprising a spherical outer wire layer and a spherical inner wire layer disposed within the spherical outer wire layer. The wire may be, for example, in the form of a coil with a helically wound primary shape (also referred to herein as a "helical coil"), and the memorized shape may comprise, for example, a spherical outer coil layer and a spherical inner coil layer disposed within the spherical outer coil layer.

In various embodiments, which may be used in combination with any of the above aspects and embodiments, the inner coil layer may have a first shape that comprises multiple turns of a first spherical helix having a first axis and the outer coil layer may have a second shape that comprises multiple turns of a second spherical helix having a second axis.

In various embodiments, which may be used in combination with any of the above aspects and embodiments, the inner coil layer may have a first shape that comprises 2 to 5 turns of a first spherical helix having a first axis and the outer coil layer may have a second shape that comprises 2 to 5 turns of a second spherical helix having a second axis.

In various embodiments, which may be used in combination with any of the above aspects and embodiments, the first and second axes intersect at an angle ranging from 45° to 90°, typically ranging from 60° to a 90°, more typically ranging from 75° to 90°, even more typically ranging from 85° to 90°.

In various embodiments, which may be used in combination with any of the above aspects and embodiments, the occlusion device may comprise an atraumatic distal coil tip.

In various embodiments, which may be used in combination with any of the above aspects and embodiments, the inner coil layer and the outer coil layer of the occlusion device each comprises ends that do not protrude outside the spherical shape.

Some aspects of the present disclosure pertain to spherical mandrels for producing a spherical occlusion device. The spherical mandrels comprise a first groove encircling the mandrel for multiple turns and a second groove encircling the mandrel for multiple turns, wherein the first and second grooves intersect and wherein the second groove is shallower than the first groove. For example, in certain embodiments, the first groove may have a depth ranging from 1.5-2.0 $D_1$ while the second groove may have a depth ranging from 0.5-1.0 $D_1$, where $D_1$ is the diameter of the wire (which may be in the form of a helical coil as previously noted).

In various embodiments, which may be used in combination with any of the above aspects and embodiments, the first groove may have a first shape that comprises multiple turns of a first spherical helix having a first axis, and the second groove may have a second shape that comprises multiple turns of a second spherical helix having a second axis.

In various embodiments, which may be used in combination with any of the above aspects and embodiments, the first and second axes intersect at an angle ranging from 45° to 90°, typically ranging from 60° to a 90°, more typically ranging from 75° to 90°, even more typically ranging from 85° to 90°.

In various embodiments, which may be used in combination with any of the above aspects and embodiments, the mandrel may comprise a first anchor adjacent to the first groove and a second anchor adjacent the second groove.

In various embodiments, which may be used in combination with any of the above aspects and embodiments, the spherical mandrels further comprise a directional member that is configured to permit a wire disposed on the mandrel to transition from the first groove to the second groove.

Some aspects of the present disclosure pertain to methods of making an occlusion device that comprise (a) winding a wire onto a spherical mandrel like that described in any of the above aspects and embodiments, such that the wire is disposed within the first and second grooves; and (b) annealing the wire to form an occlusion device having a memorized shape (e.g., by applying heat for a time and temperature sufficient to form the memorized shape) comprising a spherical outer wire layer and a spherical inner wire layer disposed within the outer wire layer.

In some embodiments, the wire is onto the spherical mandrel by a process that comprises fixing a first end of the wire to a first anchor, winding the wire around the spherical mandrel using the first groove as a guide, changing a direction of a wind of the wire by engagement with a direction changing member, winding the wire around the spherical mandrel using the second groove as a guide, and attaching a second end of the wire to a second anchor.

In various embodiments, which may be used in combination with any of the above aspects and embodiments, the wire may be in a form of a helical coil.

Some aspects of the present disclosure pertain to methods of forming an occlusion comprising (a) advancing a catheter to an entrance of an aneurysm, (b) delivering an occlusion device comprising a wire through the catheter into the aneurysm, wherein the wire is constrained to a substantially linear shape when in the catheter and wherein, upon relaxation after delivery, the wire relaxes to a memorized spherical shape that comprises an outer wire layer and an inner wire layer disposed within the outer wire layer.

In various embodiments, which may be used in combination with any of the above aspects and embodiments, the wire may be in a form of a helical coil that forms a spherical outer coil layer and a spherical inner coil layer disposed within the spherical outer coil layer.

In various embodiments, which may be used in combination with any of the above aspects and embodiments, the inner coil layer may have a first shape that comprises multiple turns of a first spherical helix having a first axis and the outer coil layer may have a second shape that comprises multiple turns of a second spherical helix having a second axis.

In various embodiments, which may be used in combination with any of the above aspects and embodiments, the inner coil layer may have a first shape that comprises 2 to 5 turns of a first spherical helix having a first axis and the inner coil layer may have a second shape that comprises 2 to 5 turns of a second spherical helix having a second axis.

In various embodiments, which may be used in combination with any of the above aspects and embodiments, the first and second axes intersect at an angle ranging from 45° to 90°, typically ranging from 60° to a 90°, more typically ranging from 75° to 90°, even more typically ranging from 85° to 90°.

These and other aspects, embodiments and advantages of the present invention will become immediately apparent to those of ordinary skill in the art upon review of the detailed description and claims to follow.

BRIEF DESCRIPTION OF THE DRAWINGS

Aspects of the present disclosure are described below with reference to the following drawings in which like numerals reference like elements, and wherein.

DETAILED DESCRIPTION

Figure 1:
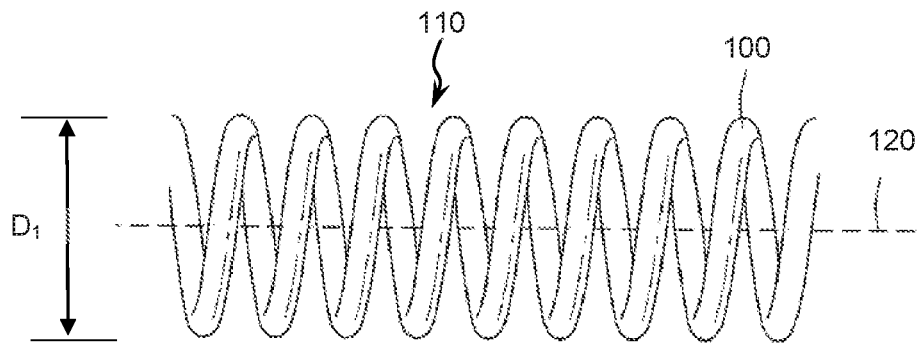
FIG. 1 is a schematic illustration of a wire material having a primary coil shape.

Unless otherwise provided in the following specification, the drawings are not necessarily to scale, with emphasis being placed on illustration of the principles of the invention.

DETAILED DESCRIPTION

According to one aspect, the present disclosure pertains to spherical occlusion devices that comprise a wire having a memorized shape comprising (a) a spherical outer wire layer and (b) a spherical inner wire layer disposed within the spherical outer wire layer. In certain beneficial embodiments, the wire is in the form of a helical coil (i.e., a coil with a helically wound primary shape, for example, like that shown in FIG. 1 discussed below) that forms a spherical outer coil layer and a spherical inner coil layer disposed within the spherical outer coil layer, in which case the occlusion device may be referred to as an occlusion coil. Such an occlusion coil may be used, for example, as a framing coil when placed into the vasculature, for example, when placed in a vascular malformation such as an aneurysm or an arteriovenous malformation, among other uses.

It is to be understood that a "wire layer" and a "coil layer", as used herein, are not solid layers but rather describe an overall shape that is formed by the wire (which wire may be in the form of a helical coil, in some embodiments). For example, in FIG. 4, discussed in detail below, the occlusion device shown comprises a spherical inner coil layer formed by one end of a helical coil in the form of a first spherical helix and a spherical outer coil layer formed the other end of the helical coil in the form of a second spherical helix, which lies just outside the spherical inner coil layer in the form of the first spherical helix.

As used herein spherical objects include those taking on a generally spheroidal shape, including those having the form of a perfect or near-perfect (to the eye) sphere and those having the form of a spheroid, such as a prolate spheroid (a slightly elongated sphere) or an oblate spheroid (a slightly flattened sphere), among other regular and irregular near-spherical geometries. In certain embodiments, a maximum diameter of the spherical secondary shape is between 1 and 1.5 times a minimum diameter of the spherical secondary shape, preferably between 1 and 1.2 times a minimum diameter of the spherical secondary shape, more preferably between 1 and 1.1 times a minimum diameter of the spherical secondary shape.

During the process of manufacturing an occlusion coil, a wire is typically wound around a small diameter, cylindrical primary mandrel to form a primary coil with a helical shape (also referred to herein as a primary shape coil or simply a coil) having a primary axis. The primary shape coil is then wound around a larger diameter secondary mandrel. The secondary mandrel and wound primary shape coil are then heated to a temperature and for a time sufficient to set or program the coil in a three-dimensional secondary shape.

In the present disclosure, the secondary mandrel has a spherical shape and a wire that is wound around the mandrel and heat treated takes on a spherical secondary shape. Shape memory allows the wire, in its resting position, to assume the shape taken on by the wire when it was heat treated on the secondary mandrel. In various embodiments described herein, the wire is in the form of a coil. However, it is to be understood that the wire may be non-coiled as well.

Suitable metals and alloys for forming the wire may include platinum group metals, particularly platinum, rhodium, palladium, and rhenium, as well as tungsten, gold, silver, tantalum, and alloys of these metals including platinum/tungsten alloy. These materials have significant radiopacity, and their alloys may be tailored to have a blend of flexibility and stiffness for the coil. They are also generally biologically inert.

Alternatively or in addition, the wire may be constructed from, or otherwise include polymer fibers to promote blood clotting in the vessel.

Referring now to FIG. 1, in some embodiments, a wire 100 may be treated to assume a primary shape coil 110 that defines a primary axis 120. The primary shape coil 110 has a primary diameter $D_1$ and can be formed using known manufacturing methods. The diameter of the primary shape coil may range, for example, from 0.012" to 0.021" (0.30 mm to 0.53 mm), among other values. The primary shape coil 110 may typically have about ten (e.g., 5 to 15) turns per centimeter, among other possibilities. When the wire 100 is made from a metal or metal alloy, the diameter of the wire may be between about 0.002" and 0.005" (0.05 mm and 0.13 mm), among other values. Such a wire 100 may be of an appropriate diameter, for example, to provide sufficient radial force to hold the occlusion device in place within a chosen body cavity without distending the wall of the cavity and/or without moving substantially from the cavity as a result of the repetitive fluid pulsing experienced within the vascular system.

The wire 100 having the primary shape 110 may be treated further to assume a secondary shape as discussed below. In this regard, after the wire has been set it its primary shape 110, the wire may be wound around a secondary mandrel. The secondary mandrel and the wound wire are then heat treated to program or set the wire in an appropriate memorized secondary shape.

Figure 2A:
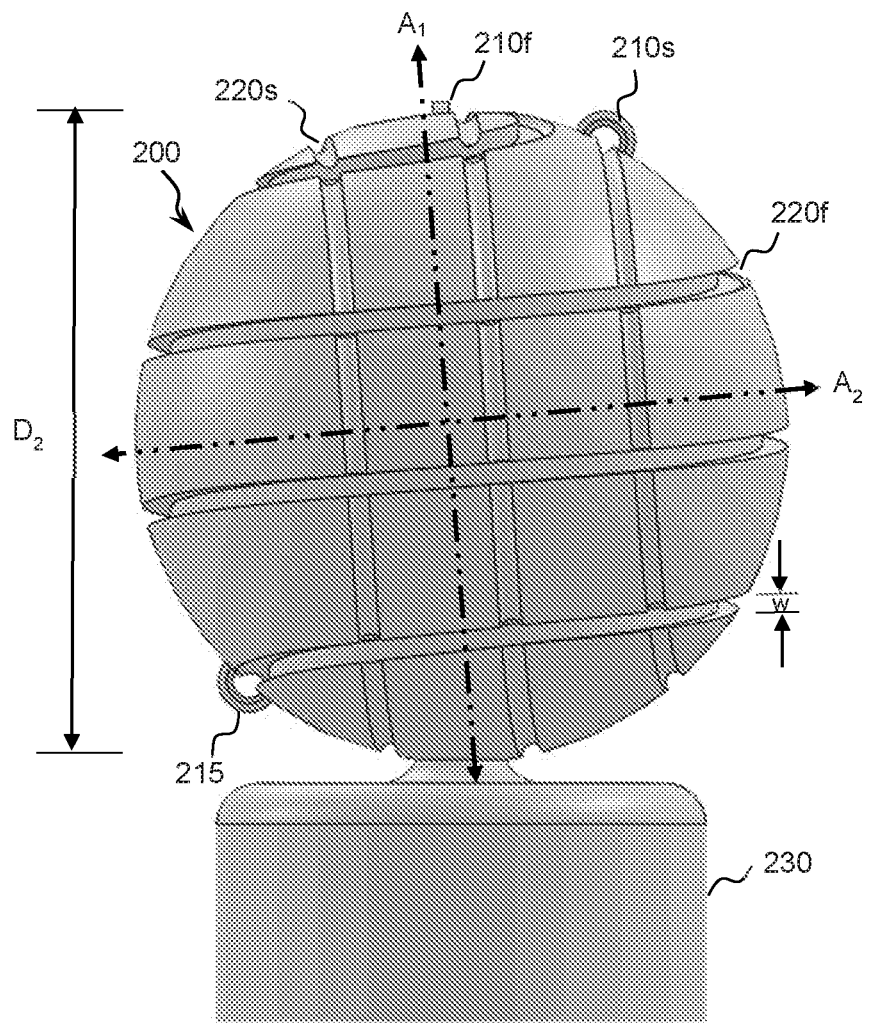
FIGS. 2A-2D are schematic illustrations showing from various vantage points a secondary mandrel for forming an occlusion device.
Figure 2B:
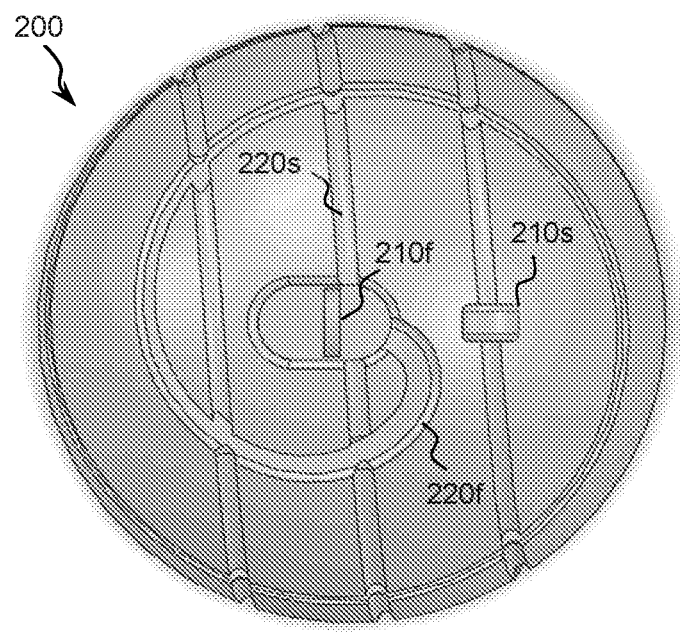

Secondary mandrels in accordance with the present disclosure are spherical in shape. A specific example of such a secondary mandrel 200 is shown in FIGS. 2A-2D. Referring to FIG. 2A, the diameter $D_2$ of the secondary mandrel 200 will correspond approximately to the desired secondary coil shape diameter. In the embodiment shown, there are anchoring points at positions around the secondary mandrel 200 to hold the wire (e.g., primary shape coil) in position, in particular, a first anchor 210f for the start of the winding process and a second anchoring point 210s for the completion of the winding process. Although not shown, the anchors 210f, 210s may be designed such that they do not protrude outside the spherical shape, for example by providing a hole with set screw or other fixation means. Occlusion devices such as occlusion coils commonly have an atraumatic tip on one end of the coil. The starting anchoring point 210f may be designed to hold the atraumatic end of a coil in some embodiments. Forming an atruamatic end prior to the secondary winding process may prevent more costly defects associated with the formation of an atruamatic tip at a later stage in the process. In the embodiment shown, there is also a directional member 215 which allows a winding direction of the wire to the changed during the winding process. The directional member 215 may be, for example, in the form of a loop or peg or other suitable structure.

Figure 2C:
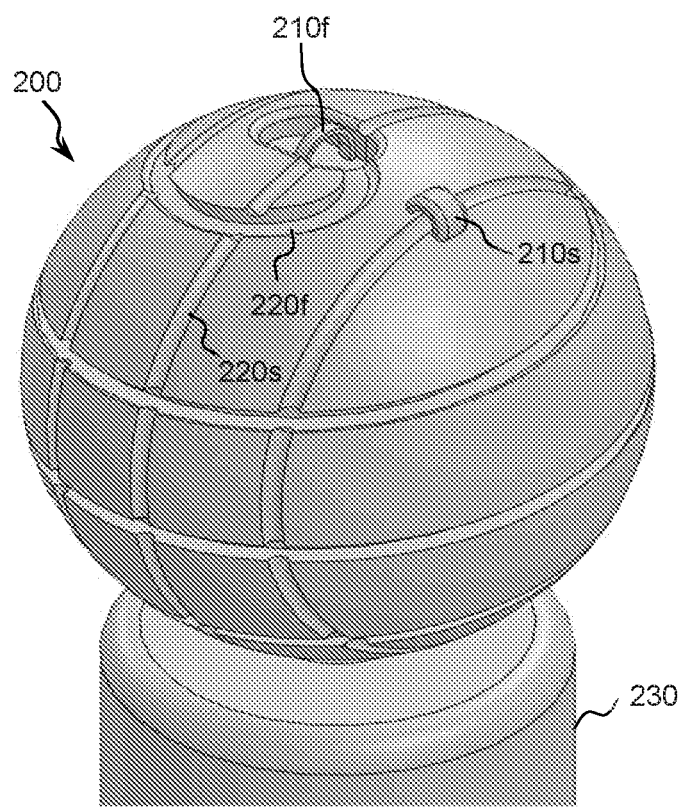
Figure 2D:
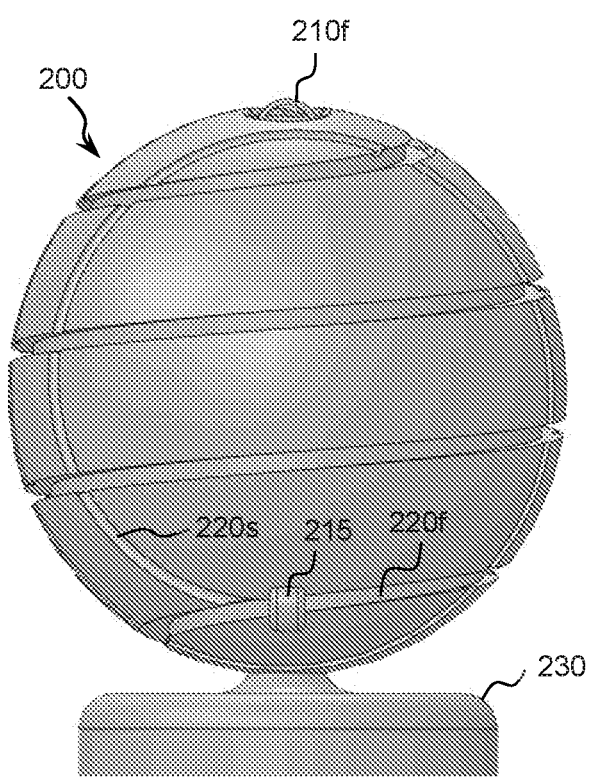
Figure 3:
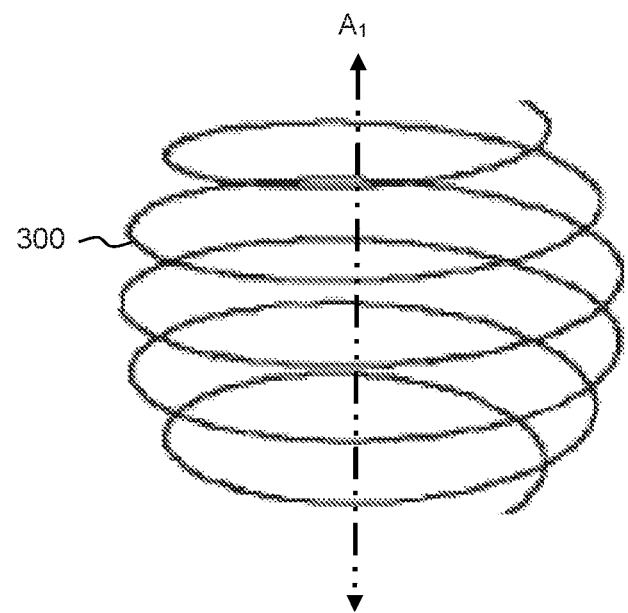
FIG. 3 is a schematic illustration of a spherical helix having an axis $A_1$.

In the design shown, the mandrel 200 comprises a first groove 220f in the form of a first spherical helix having a first axis $A_1$. Because a single spherical helix 300 is substantially mechanically compressible along its axis $A_1$ (see FIG. 3), a second groove 220s in the form of a second spherical helix having a second axis $A_2$ is provided, and the axes $A_1$, $A_2$ of the first and second helices are rotated relative to one another by predetermined angle. In certain beneficial embodiments, the first and second axes $A_1$, $A_2$ cross one another at an angle ranging from 45° or less up to 90° (the maximum possible value), for example ranging from 45° to 50° to 55° to 60° to 65° to 70° to 75° to 80° to 85° to 87.5° to 90° (i.e., ranging between any two of the preceding values), typically crossing one another at an angle ranging from 60° to a 90°, more typically ranging from 75° to 90°, even more typically ranging from 85° to 90°. In the embodiment shown, the mandrel 200 is designed such that an inner layer of wire that is wound on the mandrel 200 using first groove 220f as a guide will be positioned below the outer layer of wire that is wound on the mandrel 200 using second groove 220s as a guide. Consequently, the first groove 220f may be provided with a depth that is deeper than that of the second groove 220s, for example, in some embodiments, deeper by a depth corresponding to the diameter of the wire to be wound (e.g., $D_1$ in the case of a primary shape coil). As one example, the first groove may have a depth of 1.5 $D_1$ whereas the second groove may have a depth of 0.5 $D_1$. As another example, the first groove may have a depth of 2.0 $D_1$ whereas the second groove may have a depth of 1.0 $D_1$. The width w of the first groove 220f will typically be at least $D_1$, beneficially, about 1.5 $D_1$. The width of the second groove may be less than $D_1$ in some embodiments, as the wire being wound need not fit entirely within the second groove 220s. The mandrel may be provided with a handle 230 (a portion of which is shown in FIGS. 2A, 2C and 2D) to allow an operator to maneuver the coil and mandrel.

Secondary mandrels in accordance with the present disclosure may be formed from a variety of known materials capable of being heated during device manufacturing, e.g., when the wire is heat treated. Exemplary secondary mandrel materials may include metals such as stainless steel, as well as ceramic or other refractory materials including, but not limited to, alumina or zirconia. In one beneficial embodiment, the secondary mandrel may be made from stainless steel and may be manufactured using 3D laser printing. As previously indicated, the secondary mandrel provides a support for winding a wire and provides a specific secondary shape when the secondary mandrel and wire are heated.

Prior to heat treatment, the wire may be wound around the mandrel in a sequence to give the coil a spherical secondary shape. For example, with reference to FIGS. 2A-2D, a wire may be (a) affixed at the first anchor 210f, (b) wound around the mandrel 200 in a first direction using the spherical helical first groove 220f as a guide, (c) placed into engagement with the directional member 215 (i.e., threaded through a loop associated with the directional member 215 in the embodiment shown), allowing a winding direction of the wire to be changed such that the wire can be (d) wound around the mandrel 200 in a second direction using the spherical helical second groove 220s as a guide, and (e) secured to the second anchor 210s. The diameter $D_2$ of the secondary mandrel (after taking into account groove depth) will correspond to the required outer diameter of the resulting occlusion device. The wire is then heat treated to retain the secondary structure. For example, a wire made of a platinum, palladium, or platinum/tungsten alloy, among other possibilities, may be wound around the secondary mandrel and can be heated to a suitable temperature for a suitable time to program or set the secondary shape. Persons of ordinary skill in the art will recognize that heating temperatures and durations can vary with different materials. In one specific example where nitinol is selected as a material, the temperature may range, for instance, from 460° C. to 530° C. and the time may vary, for instance, from 1 to 30 minutes, among other possibilities. After heat treatment, the occlusion device may be removed from the mandrel.

In this way a secondary structure with an inner wire layer and an outer wire layer may be produced, in which an inner wire layer (e.g., an inner coil layer) in the form of a first spherical helix sits below an outer wire layer (e.g., an outer coil layer) in the form of a second spherical helix. In various embodiments, axes of the two spherical helices cross one another at an angle dictated by the grooves of the mandrel, for example, crossing one another at an angle ranging from 45° or less to 90° (the maximum possible value), for example ranging from 45° to 50° to 55° to 60° to 65° to 70° to 75° to 80° to 85° to 87.5° to 90°, typically crossing one another at an angle ranging from 60° to a 90°, more typically ranging from 75° to 90°, even more typically ranging from 85° to 90°.

Figure 4:
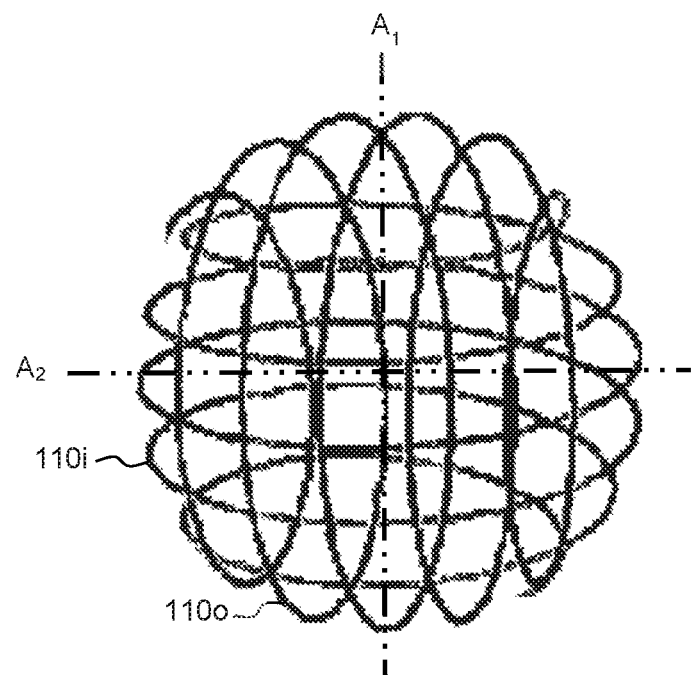
FIG. 4 is a schematic illustration of an occlusion coil having a spherical secondary shape.

As one specific example shown in FIG. 4, an annealed spherical occlusion device with a secondary structure comprising two coil layers may be produced, in which an inner coil layer 110*i* in the form of a first spherical helix having approximately five turns and having an axis $A_1$ is positioned below an outer coil layer 110*o* in the form of a second spherical helix having approximately five turns and having an axis $A_2$, which oriented at a 90° angle with respect to axis $A_1$.

Such an occlusion device differs somewhat from a device produced by the mandrel of FIGS. 2A-2D, for example, in that an inner coil layer produced by mandrel of FIGS. 2A-2D is in the form of a first spherical helix having approximately four turns and an outer coil layer produced by the mandrel of FIGS. 2A-2D is in the form of a second spherical helix having approximately three turns.

As can be seen from the preceding description, occlusion devices in accordance with the present disclosure may be formed having a variety of diameters. Typical diameters range, for example, from about 6 mm to 20 mm, among other values. Typically, the inner and outer wire layers will have between 2 and 5 turns, among other values.

In use, the resulting occlusion device may be constrained in a primary (substantially linear) configuration and may be provided with a shape memory that biases the coil to assume a three-dimensional spherical secondary configuration when in a relaxed state. Thus, when the coil is not restricted by external forces or barriers, it may assume a relaxed, three-dimensional secondary shape such as that shown in FIG. 4, among many other possibilities. For example, the occlusion device may assume a primary (substantially linear) configuration when it is disposed within a catheter or other delivery device used to deliver the coil into a patient's body.

In one specific embodiment, a catheter may be introduced into a patient's body, generally from a percutaneous entry site, e.g., into a peripheral artery, such as the femoral or carotid arteries (not shown), as is known in the art. The catheter may be advanced over a guidewire or other rail previously placed within the patient's vasculature using known methods. For example, in one particular embodiment, the catheter may be advanced through the patient's vasculature until a distal end of the catheter is disposed within a blood vessel adjacent to an aneurysm or other vascular malformation. Once the catheter is properly positioned, an occlusion device may be advanced through a lumen of the catheter in a primary (substantially linear) configuration, emerging from a distal tip of the catheter and into the vascular malformation. As the occlusion device is deployed and allowed to relax, it assumes a three-dimensional secondary configuration, as previously discussed. In certain beneficial embodiments, the secondary configuration is selected so that the occlusion device substantially fills the vascular malformation. The occlusion device may be delivered using delivery wire which can be connected using an interlocking detachment system as is known in the art. Advancing the delivery wire will deploy the occlusion device out of the catheter. The catheter may be removed after the occlusion device is fully deployed within the aneurysm, as is known in the art.

Although various embodiments are specifically illustrated and described herein, it will be appreciated that modifications and variations of the present disclosure are covered by the above teachings and are within the purview of the appended claims without departing from the spirit and intended scope of the invention.

What is claimed is:

1. A spherical mandrel for producing an occlusion device having a memorized spherical shape, comprising:
   a first groove extending about the spherical mandrel for a plurality of turns; and
   a second groove extending about the mandrel for a plurality of turns;
   wherein the first and second grooves intersect and wherein the second groove is shallower than the first groove.

2. The spherical mandrel of claim 1, wherein the first groove has a first shape that comprises the plurality of turns about a first axis of a first spherical helix and wherein the second groove has a second shape that comprises the plurality of turns about a second axis of a second spherical helix.

3. The spherical mandrel of claim 2, wherein the first and second axes intersect at an angle ranging from 45° to 90°.

4. The spherical mandrel of claim 1, wherein the mandrel comprises a first anchor adjacent to the first groove and a second anchor adjacent the second groove.

5. The spherical mandrel of claim 4, further comprising a directional member that is configured to permit a wire disposed on the mandrel to transition from the first groove to the second groove.

6. A method of making an occlusion device using the spherical mandrel of claim 5, comprising:
   fixing a first end of a wire to the first anchor;
   winding the wire about the spherical mandrel within the first groove;
   changing a direction of a wind of the wire by engaging the wire with the directional member;
   winding the wire about the spherical mandrel within the second groove;
   attaching a second end of the wire to the second anchor; and
   annealing the wire to form the occlusion device having a memorized shape comprising a spherical outer wire layer and a spherical inner wire layer disposed within the spherical outer wire layer.

7. A spherical mandrel for producing an occlusion device having a memorized spherical shape, comprising:
   a spherical body;
   a first anchor disposed on the spherical body;
   a first groove having a first end at the first anchor, the first groove extending about the spherical body for a plurality of turns; and
   a second groove having a first end coincident with a portion of the first groove, the second groove extending about the mandrel for a plurality of turns;
   wherein the second groove is shallower than the first groove.

8. The spherical mandrel of claim 7, further comprising a directional member disposed adjacent the first end of the second groove, the directional member configured to orient a wire from the first groove towards the second groove.

9. The spherical mandrel of claim 7, wherein the plurality of turns of the first groove extend about a first axis and the plurality of turns of the second groove extend about a second axis, and wherein the first axis and the second axis are substantially perpendicular to each other.

10. The spherical mandrel of claim 7, wherein the second groove intersects the first anchor.

11. The spherical mandrel of claim 7, wherein each of the first groove and the second groove form a helical shape.

12. The spherical mandrel of claim 7, further comprising a second anchor disposed along the second groove.

13. The spherical mandrel of claim 7, wherein the first anchor is at least partially recessed relative to an outer surface of the spherical body.

14. The spherical mandrel of claim 7, wherein the first anchor comprises one of a loop, a peg, a hole, and a screw.

15. A method of making the occlusion device using the spherical mandrel of claim 7, comprising:
  winding a wire onto the spherical body such that the wire is disposed within the first and the second grooves; and
  annealing the wire to form the occlusion device having a memorized shape comprising a spherical outer wire layer and a spherical inner wire layer disposed within the spherical outer wire layer.

16. A method of forming an occlusion device, comprising:
  temporarily coupling a first end of a wire to the first anchor of the spherical mandrel of claim 7;
  winding the wire into a first plurality of turns about the spherical body along the first groove of the spherical body; and
  winding the wire along into a second plurality of turns about the first plurality of turns along the second groove of the spherical body.

17. The method of claim 16, further comprising transitioning the wire from the first plurality of turns to the second plurality of turns along a directional member of the spherical body.

18. The method of claim 16, further comprising temporarily coupling a second end of the wire to a second anchor disposed along the first groove of the spherical body.

19. The method of claim 16, wherein the first plurality of turns is formed about a first axis, the second plurality of turns is formed about a second axis, and wherein the first axis is substantially perpendicular to the second axis.

20. The method of claim 16, further comprising annealing the wire while the wire is disposed within the first groove and the second groove of the spherical body.

* * * * *